US010876699B2

(12) United States Patent
Spencer

(10) Patent No.: US 10,876,699 B2
(45) Date of Patent: Dec. 29, 2020

(54) ADAPTIVE HEADLAMP FOR OPTICALLY AND ELECTRONICALLY SHAPING LIGHT

(71) Applicant: Flex-N-Gate Advanced Product Development, LLC, Tecumseh (CA)

(72) Inventor: Brett Reid Spencer, Farmington Hills, MI (US)

(73) Assignee: Flex-N-Gate Advanced Product Development, LLC, Tecumsech (CA)

(*) Notice: Subject to any disclaimer, the term of this patent is extended or adjusted under 35 U.S.C. 154(b) by 0 days.

(21) Appl. No.: 16/561,660

(22) Filed: Sep. 5, 2019

(65) Prior Publication Data

US 2020/0072432 A1    Mar. 5, 2020

Related U.S. Application Data

(60) Provisional application No. 62/727,076, filed on Sep. 5, 2018.

(51) Int. Cl.
| | |
|---|---|
| *F21S 41/663* | (2018.01) |
| *F21S 41/151* | (2018.01) |
| *F21S 41/143* | (2018.01) |
| *F21S 41/255* | (2018.01) |
| *F21W 102/14* | (2018.01) |

(52) U.S. Cl.
CPC .......... *F21S 41/663* (2018.01); *F21S 41/143* (2018.01); *F21S 41/151* (2018.01); *F21S 41/255* (2018.01); *F21W 2102/14* (2018.01)

(58) Field of Classification Search
CPC ...... F21S 41/663; F21S 43/145; F21S 41/143; F21W 2102/14
See application file for complete search history.

(56) References Cited

U.S. PATENT DOCUMENTS

| | | | | |
|---|---|---|---|---|
| 2002/0034081 A1* | 3/2002 | Serizawa | ............... | F21S 43/30 362/540 |
| 2009/0097268 A1* | 4/2009 | Mochizuki | ............ | F21S 41/148 362/538 |
| 2011/0235349 A1* | 9/2011 | Nakaya | ................. | F21S 41/143 362/466 |
| 2016/0161076 A1* | 6/2016 | Shibata | ................. | B60Q 1/525 362/509 |
| 2016/0368414 A1 | 12/2016 | Son et al. | | |
| 2017/0130924 A1 | 5/2017 | Kawai et al. | | |

FOREIGN PATENT DOCUMENTS

JP    2015216023 A    12/2015

OTHER PUBLICATIONS

PCT Patent Application No. PCT/US2019/049641 International Search Report and Written Opinion dated Nov. 28, 2019.

* cited by examiner

*Primary Examiner* — Evan P Dzierzynski
(74) *Attorney, Agent, or Firm* — Erise IP, P.A.

(57) ABSTRACT

An adaptive driving beam headlamp includes a plurality of light-emitting diodes (LEDs) aligned in a first direction. One or more projection lenses having a toric-shape are adapted for shaping light emitted from the plurality of LEDs along the first direction. A beam shaping optic is adapted to shape light emitted from the one or more projection lenses along a second direction, different from the first direction, such that a desired beam shaping pattern is produced by the beam shaping optic in combination with the one or more projection lenses. A controller is adapted for independently controlling each of the plurality of LEDs for adaptively dimming portions of a vehicle headlamp beam of light.

17 Claims, 5 Drawing Sheets

ADAPTIVE HEADLAMP FOR OPTICALLY AND ELECTRONICALLY SHAPING LIGHT

CROSS-REFERENCE TO RELATED APPLICATIONS

This application claims the benefit of U.S. Provisional Application No. 62/727,076 entitled "Adaptive Headlamp for Optically and Electronically Shaping Light" and filed on Sep. 5, 2018, which is herein incorporated by reference in its entirety.

BACKGROUND

1. Field of the Disclosure

Embodiments of this disclosure relate generally to the field of headlamp assemblies for use in vehicles. More specifically, embodiments of this disclosure relate to adaptive-driving beam headlamps for selectively dimming portions of a beam pattern from a headlamp.

2. Description of the Related Art

Many types of adaptive headlamps for vehicles are described in the prior art. For example, U.S. Pat. No. 9,494,288 to Kobayashi discloses a plurality of light-emitting diode (LED) chips for directing light toward a projection lens for an automotive headlamp. U.S. Pat. No. 9,476,558 to Stefanov et al. discloses a motor vehicle headlamp having a LED matrix, a matrix of primary lenses for reflecting light emitted from the LED matrix, and a secondary lens to generate a predefined light distribution on a road surface. European Patent Publication EP 3,181,994 to Noriko et al. discloses an adaptive headlamp for a vehicle having individually addressable LEDs and an indirect reflector. U.S. Pat. No. 9,068,711 to Na et al. discloses a glare-free high beam headlamp with a light source having individual LED chips, and a condenser lens, a beam pattern conversion lens, and an optical refractive lens for projecting light from the light source onto a road. U.S. Pat. No. 9,188,299 to Fiederling et al. discloses a plurality of LEDs and a plurality of optical waveguides aligned with the LEDs for providing lighting functions for a motor vehicle headlight. U.S. Pat. No. 9,791,120 to Kloos discloses a lens surface that shapes light from a matrix of LEDs for a headlamp, the lens surface having a shape based on a conic section equation. U.S. Pat. No. 9,470,386 to Kloos discloses a vehicle headlight with an LED matrix light source, a first lens element, and a rotationally symmetrically arranged second lens element for shaping a light distribution from the light source. U.S. Patent Publication 2016/0281952 to Kliebisch discloses an illumination device for vehicles having a semiconductor-based light source, a light scattering lens for softening light from the light source, and lenses for shaping the softened light.

SUMMARY

In an embodiment, a headlamp for a vehicle includes a first plurality of LEDs mounted on a first mount, and a second plurality of LEDs mounted on a second mount adjacent the first mount. A first projection lens is oriented to receive light emitted from the first plurality of LEDs for projecting a first light output, and a second projection lens is oriented to receive light emitted from the second plurality of LEDs for projecting a second light output. An optic spanning the first light output and second light output is oriented for shaping the first light output and the second light output to create a light pattern ahead of the vehicle. A controller is adapted to independently control each of the first plurality of LEDs and the second plurality of LEDs for adaptively dimming portions of the light pattern.

In another embodiment, an adaptive driving beam headlamp includes a plurality of light-emitting diodes (LEDs) aligned in a first direction. A projection lens has a toric-shape adapted for shaping light emitted from the plurality of LEDs along the first direction. A beam shaping optic is adapted to shape light emitted from the projection lens along a second direction, different from the first direction, such that a desired beam shaping pattern is produced by the beam shaping optic in combination with the projection lens. A controller is adapted for independently controlling each of the plurality of LEDs for adaptively dimming portions of a vehicle headlamp beam of light.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure include an adaptive-driving beam headlamp for a vehicle that provides a means to dim or turn off portions of the headlamp for the purpose of reducing glare as perceived by someone outside the vehicle (e.g., an occupant of another vehicle or a pedestrian). Disadvantages of prior adaptive headlamps, particularly those having oscillating light sources, include higher costs and higher probability of failure.

Figure 1:
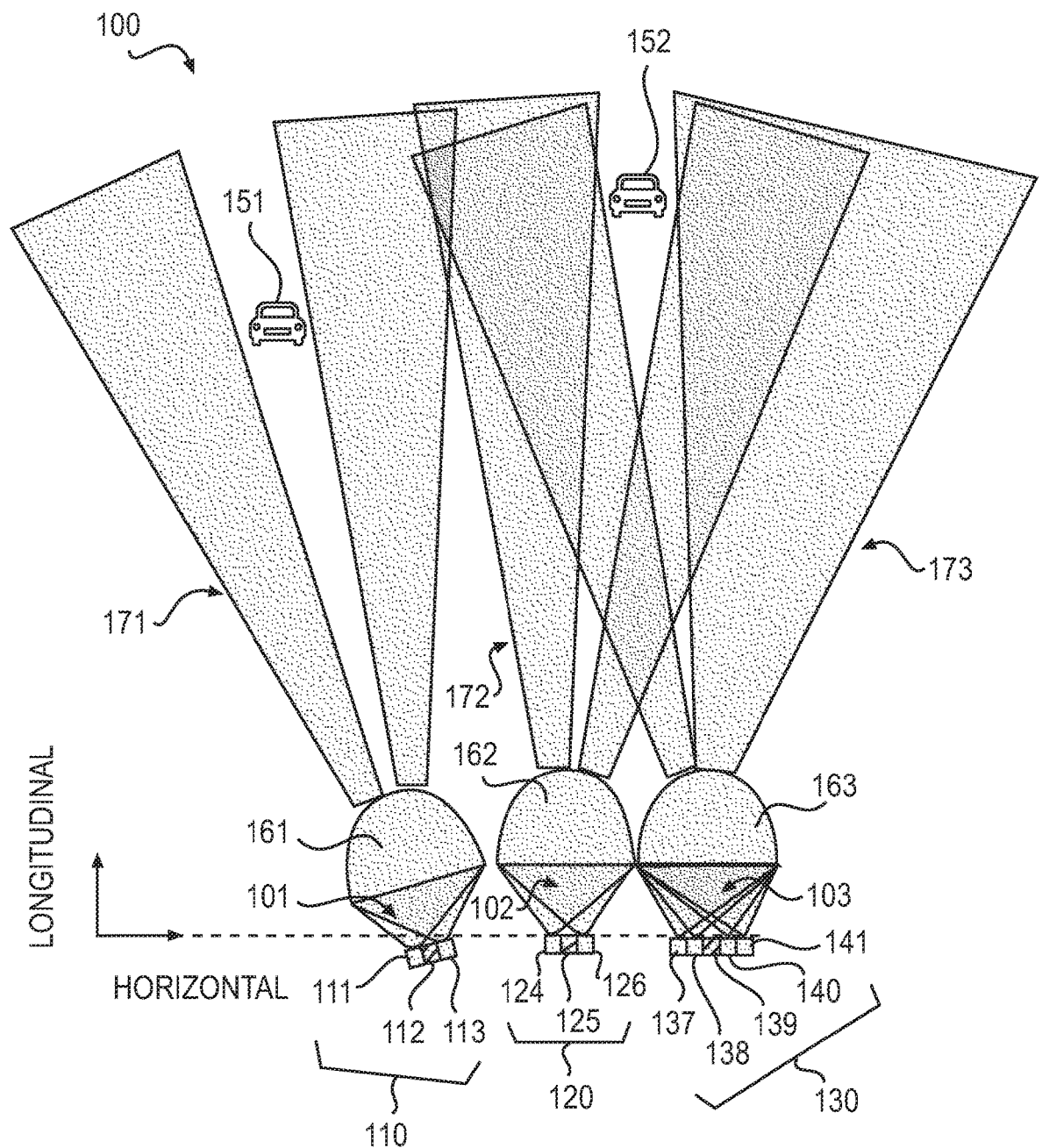
FIG. 1 is a schematic diagram showing portions of an adaptive-driving beam headlamp, in an embodiment.

FIG. 1 is a schematic diagram of an exemplary adaptive headlamp 100 having beam portions turned off to reduce glare. Adaptive headlamp 100 is for example located on a forward-facing portion of a vehicle for illuminating an area ahead of the vehicle during low ambient-lighting conditions (e.g., at night). A first LED matrix 110 includes a first LED 111, a second LED 112, and a third LED 113, which may be located on one or more printed circuit boards adapted for powering and controlling the LEDs, as further described below. As depicted in FIG. 1, first LED matrix 110 is arranged in a 1×3 array oriented horizontally lengthwise. However, first LED matrix 110 may include greater or fewer than three LEDs having alternative arrangements without departing from the scope hereof.

Emitted light 101 from first LED matrix 110 is projected through a first projection lens 161 to provide a first beam pattern 171 in front of a vehicle. As depicted in FIG. 1, first LED 111 and third LED 113 are lit while second LED 112 is turned off to reduce glare at a first target 151. First target 151 is for example another vehicle or a pedestrian. First LED matrix 110 in combination with first projection lens 161 may, in certain embodiments, provide a high-beam portion of headlamp 100. The horizontal array of LEDs in first LED matrix 110 enables an adaptive beam in a horizontal (cross-car) direction. Additional LEDs may be added to the LED matrix in a vertical (up-down) direction (not shown) to enable a vertical adaptive beam.

First projection lens 161 may include an undivided freeform optic surface, an undivided aspheric, or an undivided modified aspheric surface that generates one collective undivided image in front of a vehicle when the full beam is lit. An aspheric lens is one whose surface differs in shape from portions of a sphere or cylinder.

In certain embodiments, first projection lens 161 is a modified toric-type projection lens having one or more toric-shaped lenses. A toric-shaped lens may be any lens having at least one lens surface with a curvature that resembles a portion of a torus (e.g., shaped like a slice from a circumferential edge of a torus). A torus is a spatial shape formed by revolving a circle in three-dimensional space about an axis that is coplanar with the circle. The toric-shaped lens surface provides a lens having different optical power and focal length in two orientations perpendicular to each other (e.g., a horizontal orientation and a vertical orientation).

First projection lens 161 is centered over LED matrix 110 and used to shape light emitted from LED matrix 110. In certain embodiments, first projection lens 161 is configured for shaping light in a horizontal (e.g., cross-car) direction. For example, first projection lens 161 may be adapted for collimating light in the horizontal direction only. Collimated light is light whose rays are parallel, and therefore will spread minimally as it propagates.

As depicted in FIG. 1, the horizontal direction is a side-to-side or cross-car direction, a longitudinal direction is perpendicular to the horizontal direction and in the plane of the road (e.g., straight ahead), and a vertical direction (not shown) is an up-down direction that is perpendicular to the horizontal and longitudinal directions (e.g., out of the plane formed between the horizontal and longitudinal directions).

In certain embodiments, first projection lens 161 is adapted to facilitate dimming or turning off beam segments in coordination with individual LEDs of first LED matrix 110. For example, the horizontal position of first LED 111, second LED 112, and third LED 113 relative to first projection lens 161 determines the direction and extent of the beam segment in the horizontal direction. By dimming one of first, second, and third LEDs 111, 112, 113, a beam segment corresponding to the dimmed LED is dimmed from within beam pattern 171. As depicted in FIG. 1, second LED 112 is dimmed and the corresponding middle beam segment of beam pattern 171 is also dimmed. By dimming one or more LEDs, overlapping beam segments may be dimmed.

A second LED matrix 120 is an example of first LED matrix 110. Second LED matrix 120 includes a fourth LED 124, a fifth LED 125, and a sixth LED 126, which may be located on one or more printed circuit boards and arranged in a 1×3 array oriented horizontally lengthwise. However, second LED matrix 120 may include greater or fewer than three LEDs having alternative arrangements without departing from the scope hereof. Emitted light 102 from second LED matrix 120 is projected through a second projection lens 162 to provide a second beam pattern 172. Second projection lens 162 is an example of first projection lens 161. As depicted in FIG. 1, fourth LED 124 and sixth LED 126 are illuminated while fifth LED 125 is turned off to reduce glare at a second target 152 (e.g., another vehicle or a pedestrian). Second LED matrix 120 in combination with second projection lens 162 may, in certain embodiments, provide a high-beam portion of headlamp 100. The horizontal array of LEDs in second LED matrix 120 enables an adaptive beam in a horizontal (cross-car) direction. Additional LEDs may be added to the LED matrix in a vertical (up-down) direction (not shown) to enable a vertical adaptive beam.

A third LED matrix 130 is an example of first LED matrix 110 and includes a seventh LED 137, an eighth LED 138, a ninth LED 139, a tenth LED 140, and an eleventh LED 141, which may be located on one or more printed circuit boards and arranged in a 1×5 LED array oriented horizontally lengthwise. However, third LED matrix 130 may include greater or fewer than five LEDs having alternative arrangements without departing from the scope hereof. Emitted light 103 from third LED matrix 130 is projected through a third projection lens 163 to provide a third beam pattern 173. Third projection lens 163 is an example of first projection lens 161. In the example depicted in FIG. 1, ninth LED 139 is turned off to reduce glare at second target 152 while the other LEDs 137, 138, 140, and 141 are turned on. Third LED matrix 130 in combination with third projection lens 163 may, in certain embodiments, provide a high-beam portion of headlamp 100. The horizontal array of LEDs in third LED matrix 130 enables an adaptive beam in a horizontal (cross-car) direction. Additional LEDs may be added to the LED matrix in a vertical (up-down) direction (not shown) to enable a vertical adaptive beam.

The number of LEDs in each matrix, the number and arrangement of LED matrices, and the number of corresponding projection lenses may be varied based on the illumination requirements of the headlamp and the luminance provided by the individual LEDs, among other things. For example, higher number of LEDs increases the resolution of the adaptive light shaping capability. Although the presently disclosed embodiments are intended for use with a high-beam headlamp, a low-beam headlamp may be incorporated by adding LEDs arranged vertically, as further described below.

For example, in the embodiment depicted in FIG. 1, second LED matrix 120 is aligned substantially parallel with third LED matrix 130, whereas first LED matrix is not parallel with second and third LED matrices 120, 130. More specifically, second LED matrix 120 and third LED matrix 130 are substantially aligned with one another along a horizontal direction, whereas first LED matrix 110 is skewed in the direction of the longitudinal axis and is therefore aligned obliquely with respect to the horizontal direction. In the vertical direction, the first, second, and third LED matrices 110, 120, 130 are disposed on the same vertical plane (e.g., a plane formed by the horizontal and longitudinal axes).

Figure 2:
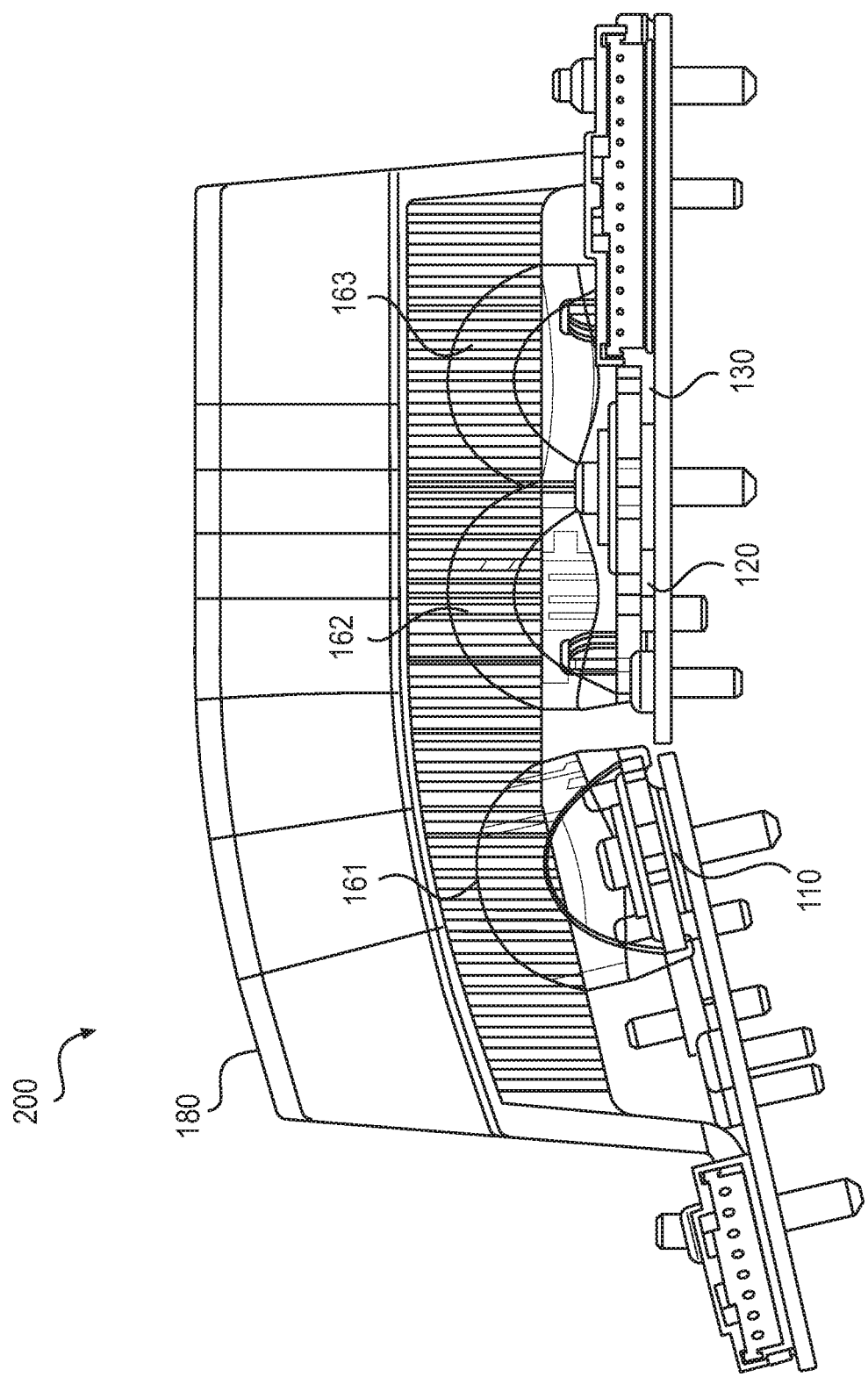
FIG. 2 shows an embodiment of a toric-optic Light Emitting Diode (LED) matrix adaptive-driving beam headlamp.

FIG. 2 shows a top-down view of an exemplary adaptive headlamp 200, which is an example of adaptive headlamp 100, FIG. 1. Items that are enumerated with like numbers from FIG. 1 are the same or similar and their description may not be repeated accordingly.

Adaptive headlamp 200 includes first LED matrix 110, second LED matrix 120, and third LED matrix 130 (see FIG. 3) for emitting light into first projection lens 161, second projection lens 162, and third projection lens 163, respectively. A beam shaping optic 180 is adapted to shape light emitted from first, second, and third projection lenses 161-163. In certain embodiments, beam shaping optic 180 is a is a swept-type or extrusion-type lens adapted to collimate light in a substantially vertical direction, perpendicular to the horizontal and longitudinal directions. In certain embodiments, an extrusion direction may include an engineered profile for shaping light. An inner surface and an outer surface of beam shaping optic 180 may each include pillow optics, flutes, a swept optic surface, or the surfaces may be flat. In certain embodiments, the outer surface includes vertical flutes, while the inner surface includes horizontal flutes. In some embodiments, the inner surface is either flat or a non-flat optical surface.

Figure 3:
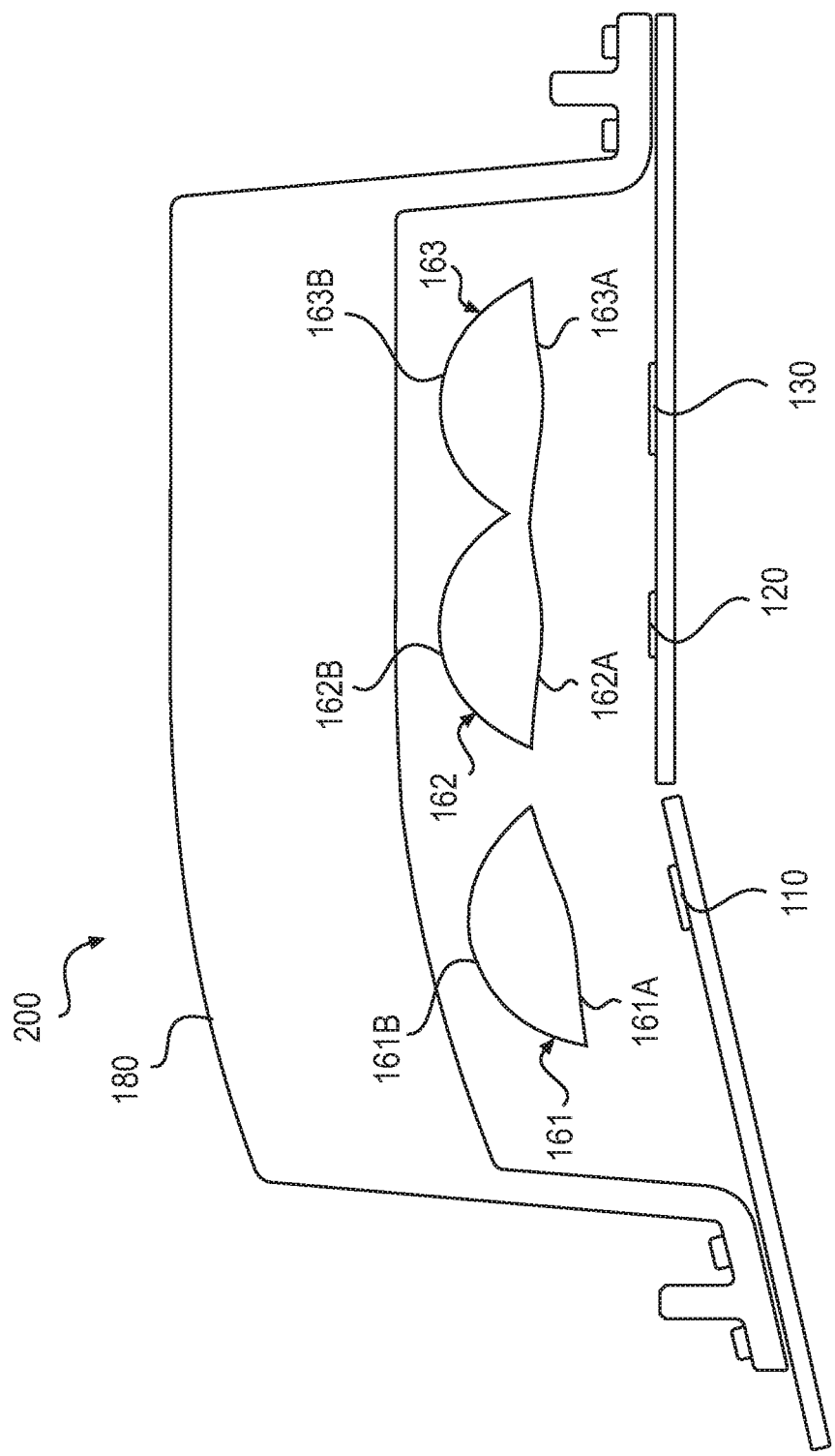
FIG. 3 highlights portions of the adaptive-driving beam headlamp of FIG. 2.

FIG. 3 highlights portions of adaptive headlamp 200. Each projection lens includes an inner surface and an outer surface. For example, first projection lens 161 includes an inner surface 161A and an outer surface 161B. Similarly, second projection lens 162 includes an inner surface 162A and an outer surface 162B, and third projection lens 163 includes an inner surface 163A and an outer surface 163B. In certain embodiments, the inner surfaces 161A, 162A, 163A and the outer surfaces 161B, 162B, 163B are toric-shaped lens surfaces. In some embodiments, the toric-shaped lenses have a circular shape in one direction, while in the perpendicular direction, the toric-shaped lenses have a spherical, aspherical (e.g., elliptical, hyperbolic, or freeform), or flat surface.

Figure 4:
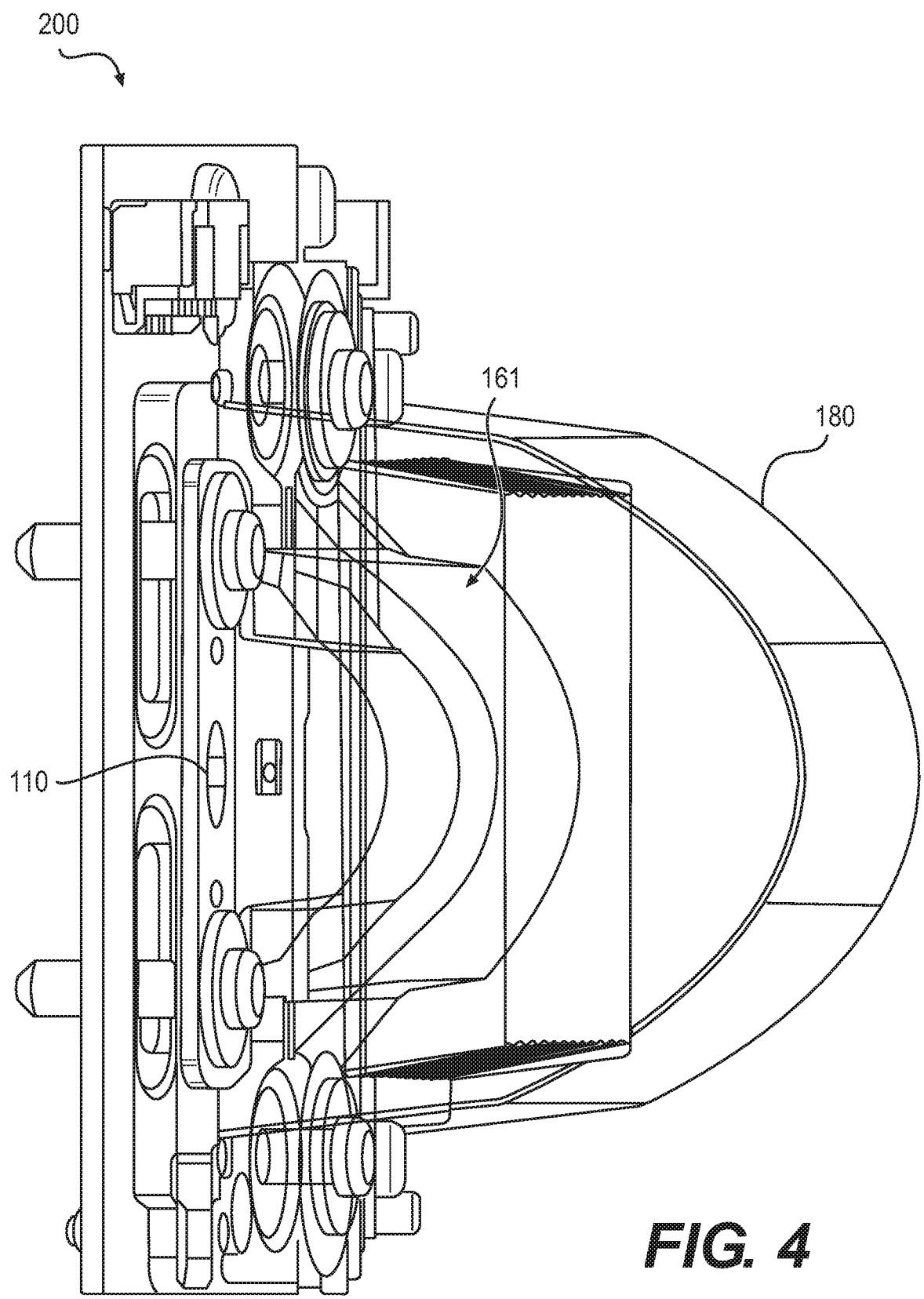
FIG. 4 shows a side view of the adaptive-driving beam headlamp of FIG. 2.
Figure 5:
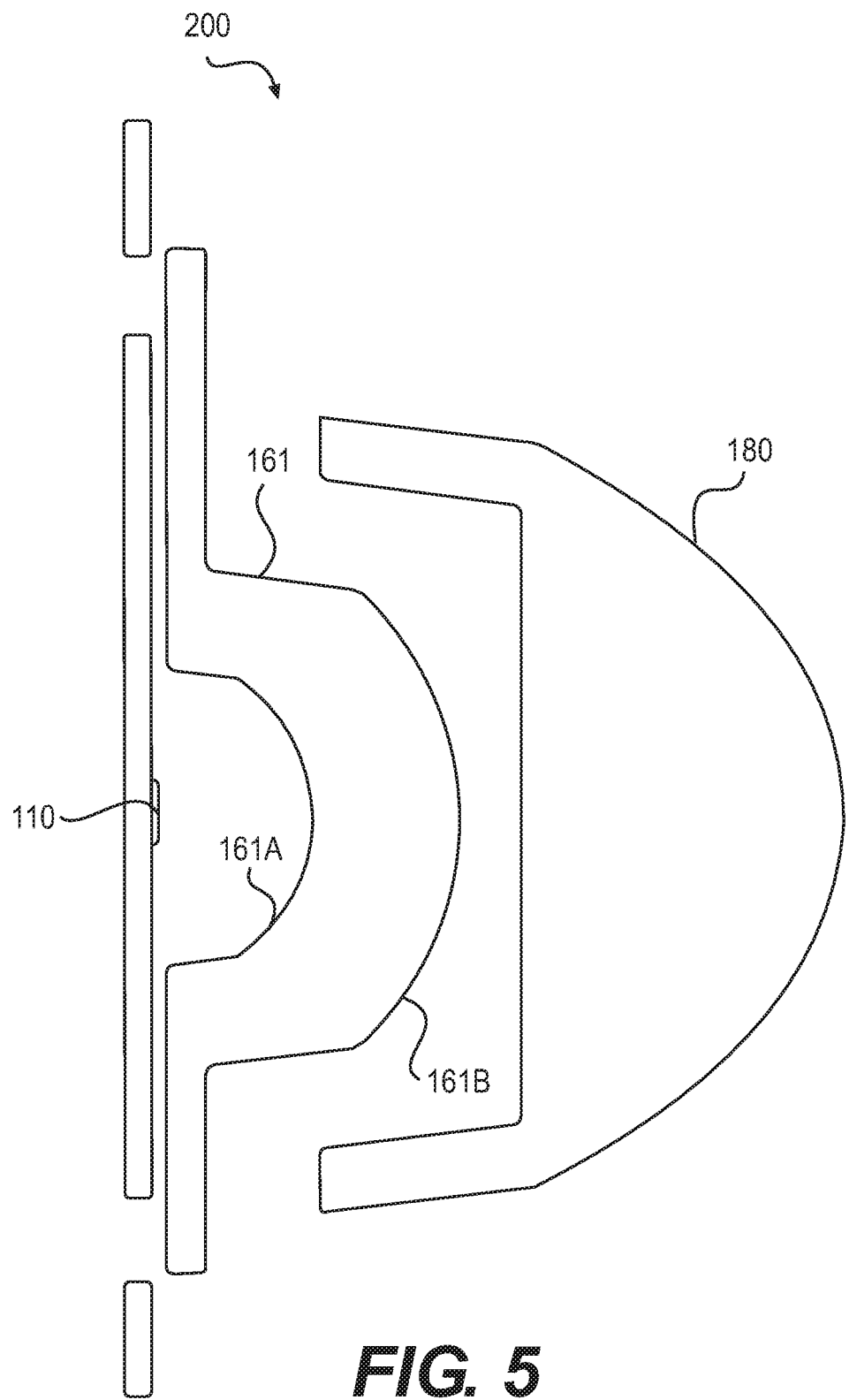
FIG. 5 highlights portions of the adaptive-driving beam headlamp from the side view of FIG. 4.

FIG. 4 shows a side view of adaptive headlamp 200, and FIG. 5 highlights portions of adaptive headlamp 200 from the side view of FIG. 4. Items that are enumerated with like numbers from FIGS. 1-3 are the same or similar and their description may not be repeated accordingly. FIGS. 4 and 5 are best viewed together with the following description.

First projection lens 161 is adapted to shape light from individual LEDs along a horizontal cross-car orientation. Shaping the light horizontally includes smoothing light from individual LEDs so that it appears as one homogenous light source as opposed to a series of discrete light sources. In other words, any gaps in between the LEDs is filled in by broadening light emitted from each LED in the horizontal direction. Second and third projection lenses 162, 163 do the same for second and third LED matrices 120, 130, respectively. Beam shaping optic 180 is adapted to shape light in the vertical direction for more than one projection lens (e.g., for first, second, and third projection lenses 161, 162, 163). This reduces the number of lenses and optics that require alignment for proper light shaping.

By controlling light output both horizontally and vertically, adaptive headlamp 200 provides greater control of the light shape. Aligning the projection lenses 161-163 and the beam shaping optic 180 is simpler than performing a two-axis alignment on a single optic adapted for shaping light in two dimensions (horizontally and vertically) because each lens requires alignment only along a single axis and the lenses may be aligned independently of one another. A low-beam function may be incorporated into headlamp 200 by adding LEDs arranged vertically with respect to the LEDs of matrices 110, 120, 130, and by including an asphere outer lens with a sharp cutoff in the beam shaping optic 180 for maintaining light directed downward towards the road and away from the eyes of occupants in nearby vehicles.

In operation, first, second, and third LED matrices 110, 120, and 130 combine their respective beam patterns 171, 172, 173 to form an overall beam pattern of adaptive headlamp 100. By dimming or turning off individual LEDs, adaptive headlamp 100 may be used to avoid glare perceived by occupants of other vehicles and pedestrians. For example, a camera system may be used to image a forward view, and a controller may be used to determine which LEDs to modulate or turn off in real-time or near real-time based on images received from the camera. For example, the controller may dim certain LEDs using pulse-width modulation. In addition to a camera, a GPS module may be used for determining a location of the vehicle and providing location information to the controller. In certain embodiments, radar information may also be provided to the controller for determining which LEDs to turn off or modulate.

The controller is for example a headlamp control module having a computer, a microcontroller, a microprocessor, or a programmable logic controller (PLC) located onboard the vehicle and communicatively coupled with the LED matrices 110, 120, 130 (e.g., via respective printed circuit boards). The controller includes a memory, including a non-transitory medium for storing software, and a processor for executing instructions of the software. The memory may be used to store information used by the controller, including but not limited to algorithms, lookup tables, and computational models. The controller may include one or more switches (e.g., for performing pulse-width modulation). Communication between the controller and the LED matrices 110, 120, 130 may be by one of a wired and/or wireless communication media.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:
1. A headlamp for a vehicle, comprising:
 a first plurality of LEDs mounted on a first mount aligned in a first direction;
 a second plurality of LEDs mounted on a second mount adjacent the first mount, the second plurality of LEDs being aligned in a second direction, wherein the first direction is aligned obliquely with respect to the second direction;
 a first projection lens oriented to receive light emitted from the first plurality of LEDs for projecting a first light output, and a second projection lens oriented to receive light emitted from the second plurality of LEDs for projecting a second light output;
 an optic spanning the first light output and second light output, the optic being oriented for shaping the first light output and the second light output to create a light pattern ahead of the vehicle; and
 a controller adapted to independently control each of the first plurality of LEDs and the second plurality of LEDs for adaptively dimming portions of the light pattern.
2. The headlamp of claim 1, wherein the second direction is a horizontal cross-car direction with respect to a vehicle.
3. The headlamp of claim 1, wherein the optic is adapted to shape light in a third direction, perpendicular to the second direction, for the first projection lens and the second projection lens thereby reducing a total number of lenses and optics requiring alignment for proper light shaping.

4. The headlamp of claim 1, comprising:
a third plurality of LEDs aligned in the second direction and mounted on a third mount adjacent the second mount;
a third projection lens oriented to receive light emitted from the third plurality of LEDs and project a third light output; and
the optic further spanning the third light output to cover and shape the third light output in addition to the first light output and the second light output.

5. The headlamp of claim 4, wherein the third direction is a vertical direction with respect to the vehicle.

6. The headlamp of claim 4, wherein the first projection lens, the second projection lens, and the third projection lens each include a toric-shaped lens surface.

7. The headlamp of claim 4, wherein the second light output overlaps the third light output forming overlapping beam segments of the light pattern, and the controller is adapted for dimming one or more LEDs from each of the second plurality of LEDs and the third plurality of LEDs thereby dimming portions of the overlapping beam segments of the light pattern.

8. A headlamp for a vehicle, comprising:
a first plurality of LEDs mounted on a first mount, and a second plurality of LEDs mounted on a second mount adjacent the first mount;
a first projection lens oriented to receive light emitted from the first plurality of LEDs for projecting a first light output, and a second projection lens oriented to receive light emitted from the second plurality of LEDs for projecting a second light output;
a beam-shaping optic spanning the first light output and second light output, the beam-shaping optic being oriented for shaping the first light output and the second light output to create a light pattern ahead of the vehicle;
the first projection lens, the second projection lens, and the beam shaping optic are each aligned independently of one another in a single axis thereby simplifying alignment compared to performing a two-axis alignment on a single optic adapted for shaping light in two directions; and
a controller adapted to independently control each of the first plurality of LEDs and the second plurality of LEDs for adaptively dimming portions of the light pattern.

9. An adaptive driving beam headlamp, comprising:
a plurality of light-emitting diodes (LEDs) aligned in a first direction;
a projection lens having a toric-shape adapted for shaping light emitted from the plurality of LEDs along the first direction;
a beam shaping optic adapted to shape light emitted from the projection lens along a second direction, different from the first direction, such that a desired beam shaping pattern is produced by the beam shaping optic in combination with the projection lens; and
a controller adapted for independently controlling each of the plurality of LEDs for adaptively dimming portions of a vehicle headlamp beam of light.

10. The adaptive driving beam headlamp of claim 9, wherein the projection lens is adapted for smoothing light from each of the plurality of LEDs such that the vehicle headlamp beam of light appears as one homogenous light source as opposed to a series of discrete light sources.

11. The adaptive driving beam headlamp of claim 9, wherein the first direction is a horizontal cross-car direction.

12. The adaptive driving beam headlamp of claim 11, wherein the second direction is a vertical direction that is substantially perpendicular to the first direction.

13. The adaptive driving beam headlamp of claim 9, wherein the projection lens is centered over the plurality of LEDs.

14. The adaptive driving beam headlamp of claim 9, wherein the projection lens is adapted for collimating light in the first direction.

15. The adaptive driving beam headlamp of claim 9, wherein the beam shaping optic is adapted for collimating light in the second direction.

16. The adaptive driving beam headlamp of claim 9, wherein the projection lens is adapted to facilitate dimming or turning off beam segments in coordination with the controller adapted for independently controlling each of the plurality of LEDs.

17. The adaptive driving beam headlamp of claim 9, comprising a high-beam headlamp of a vehicle.

* * * * *